R. HART.
MACHINE FOR TREATING GRAIN.
APPLICATION FILED JULY 29, 1908.
963,551.
Patented July 5, 1910.
2 SHEETS—SHEET 2.
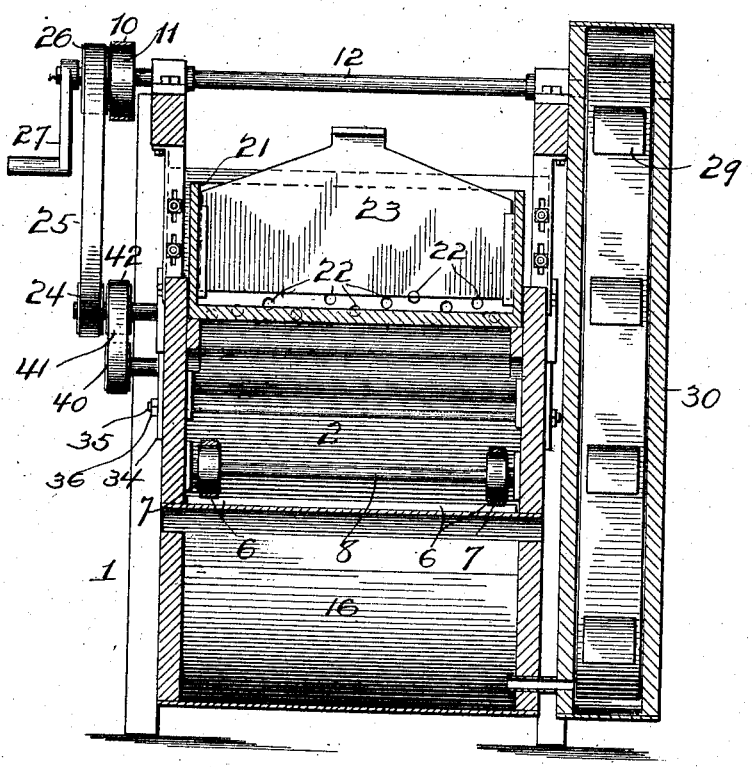
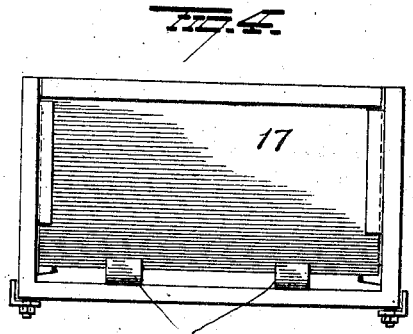
WITNESSES
E. J. Nottingham
S. J. Nottingham
INVENTOR
Robert Hart
By H. A. Seymour
Attorney

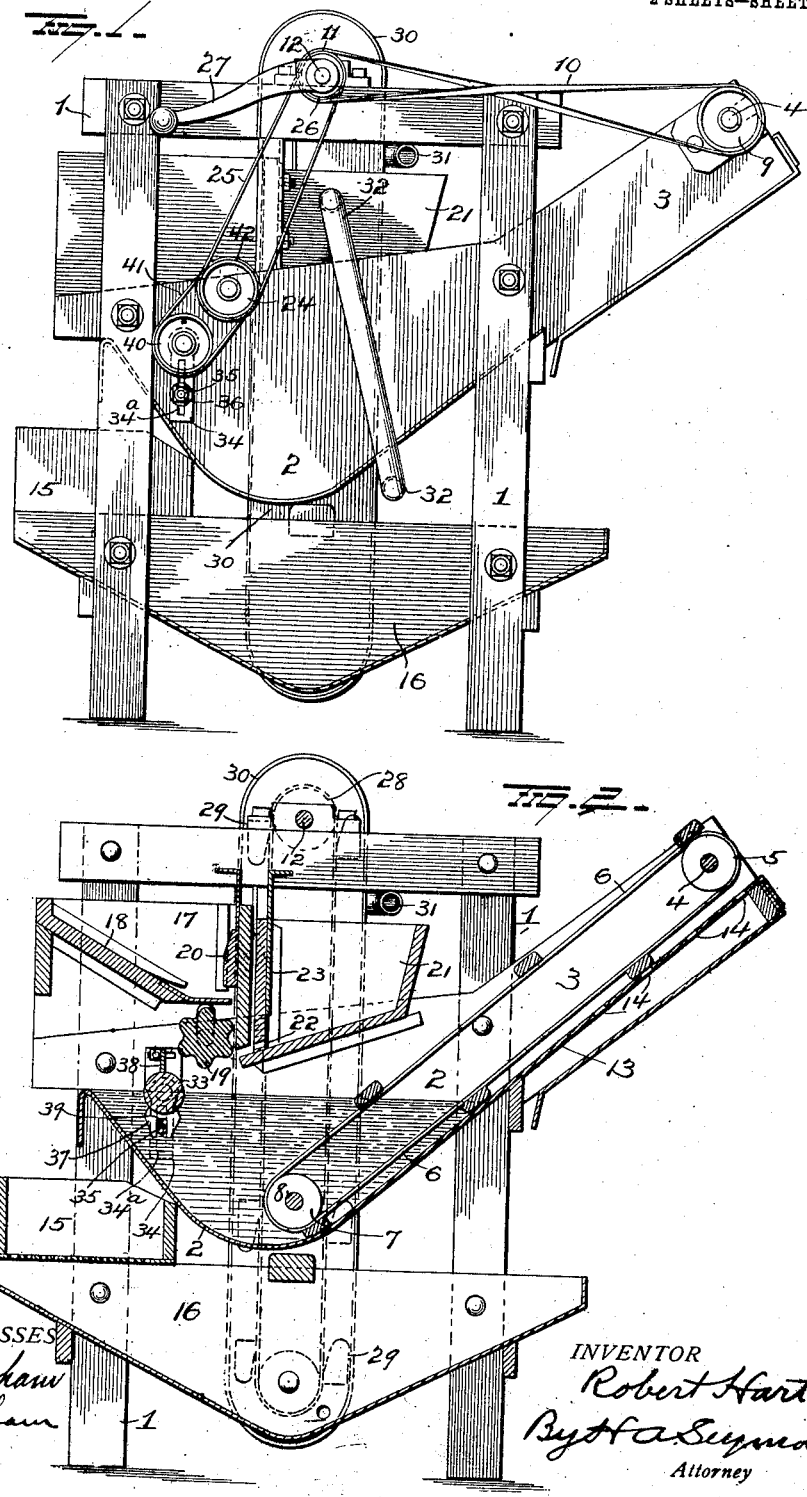

UNITED STATES PATENT OFFICE.

ROBERT HART, OF ARDOCH, NORTH DAKOTA.

MACHINE FOR TREATING GRAIN.

963,551.  Specification of Letters Patent.  Patented July 5, 1910.

Application filed July 29, 1908. Serial No. 445,915.

*To all whom it may concern:*

Be it known that I, ROBERT HART, of Ardoch, in the county of Walsh and State of North Dakota, have invented certain new and useful Improvements in Machines for Treating Grain; and I do hereby declare the following to be a full, clear, and exact description of the invention, such as will enable others skilled in the art to which it appertains to make and use the same.

This invention relates to a machine for treating grain,—the object of the invention being to provide efficient means for removing dirt and foul seeds and for treating the grain for smut.

A further object is to so construct a machine of the character described that a continuous flow of water or other fluid can be effected and so that the same water or other fluid can be used repeatedly, especially when it is desired to subject the grain to some chemical treatment.

With these and other objects in view the invention consists in certain novel features of construction and combinations of parts as hereinafter set forth and pointed out in the claims.

In the accompanying drawings, Figure 1 is a side elevation of a machine embodying my improvements. Fig. 2 is a vertical sectional view. Fig. 3 is a similar view at right angles to Fig. 2, and Fig. 4 is a plan view of the hopper 17.

1 represents a framework in which, between the top and bottom thereof, a trough 2 is secured and provided with an upwardly projecting, inclined chute 3. The side walls of this chute are provided at their upper ends with bearings for a shaft 4 having wheels 5 secured thereto for the passage of an endless conveyer 6. This endless conveyer extends downwardly into the trough and passes over wheels 7 secured to a shaft 8 mounted at its ends in the side walls of said trough. The shaft 4 projects beyond its bearing in one of the side walls of the chute and is provided with a pulley 9 to receive a belt 10 by means of which motion is transmitted to the conveyer from a pulley 11 on a shaft 12 mounted upon the framework 1. The chute 3 is provided with a false bottom 13 having perforations 14 through which water which may be elevated with the grain from the trough can pass. Such water will flow downwardly over the bottom of the chute and be discharged from the lower end thereof into a receptacle 16 secured in the bottom of the framework.

A vertically adjustable hopper 17 is located in the upper portion of the framework and is adapted to receive the grain to be cleaned. The inclined bottom 18 of this hopper is movable in order to regulate the flow of grain from the bottom of the hopper to a grooved feed roller 19 mounted under said bottom of the hopper. A slide 20 is located against the vertical wall of the hopper so that it will be adjustable with relation to the feed roller and thus control the speed and quantity of the feed of the latter. It will be observed that the grain hopper is located directly over the trough 2. Also located over said trough and disposed alongside the hopper is a smaller trough 21 having a series of holes 22 in proximity to its bottom through which water from the trough 21 can flow into trough 2. The holes 22 are arranged at different distances from the bottom of the trough so that by means of a gate 23 the quantity of water flowing from said trough can be accurately regulated. By making the hopper 17 adjustable vertically, the extent of fall of the grain can be increased or decreased according to the character of the grain under treatment and the amount of fall necessary to force the grain through the current of water flowing from the trough 21. Trough 21 is movable so that it can be slid horizontally to and from the flow of grain from hopper 17 and thus increase or diminish the agitation on the surface of the water in trough 2, the object being to have the grain drop on a smooth surface of water and sink through the water leaving the dirt and foul seed to float off on top of the water in trough 2.

In order to rotate the grooved feed roller 19 one journal thereof is extended beyond its bearing in the side wall of the trough 2 and is provided with a pulley 24 over which a belt 25 passes, said belt receiving motion from a pulley 26 on the shaft 12. The shaft 12 may be provided at one end with any suitable means for receiving motion from any source of power. In the drawing I have shown said shaft provided with a crank arm 27. The other end of the shaft 12 projects beyond the side of the framework and is provided with a pulley 28 for the accommodation of and for operating a water elevator 11

29 inclosed within a suitable housing 30 secured to the side of the framework. This water elevator (which may be of any preferred construction) communicates at its lower end with the water receptacle 16 at the bottom of the framework and at its upper end, said water elevator discharges, through a pipe 31 into the upper water trough 21. An overflow pipe 32 communicates at one end with the upper portion of the trough 21 and at its lower end discharges into the water receptacle 16. A screening box 15 is located over one end of the water receptacle 16 and is designed to intercept the seed or other solids which might overflow with the water over the end of the water trough 2.

From the construction and arrangement of parts above described, it will be observed that grain from the hopper 17 and water from the trough 21 will flow simultaneously into the trough 2. When barley or oats are to be treated, a roller 33 is mounted in said trough 2. This roller is located in proximity to the point where the barley or oats strikes the water so that the same may engage it and be carried under the surface of the water. The roller 33 is provided with journals mounted in plates 34 and the latter are provided with slots 34ª for the reception of bolts 35 having nuts 36 whereby said plates can be secured in any desired vertical adjustment to cause the roller to dip more or less in the water in the trough 2, and to permit said roller to be raised above the surface of the water, as it will be when grain, other than barley or oats is being treated. Hangers 37 are supported within the trough 2 by the journals of the roller 33, and to these hangers, scrapers 38 for the roller, are attached. The hangers 37 are made with slots 39 to receive the bolts 35, and in this manner, said hangers are prevented from turning. One journal of the roller 33 is provided with a pulley 40, which receives motion, through the medium of a strap 41, from a pulley 42. As the grain settles in the bottom of the trough 2 it will be removed therefrom, together with more or less water, by the operation of the endless conveyer,— the grain being discharged by said conveyer over the upper end of the chute and the water finding its way through the perforations in the false bottom of the chute, will flow back into the trough or receptacle 16. When the grain has been thus treated, not only will the foreign matter be removed or washed out of the grain but the latter will also be thoroughly cleansed of smut. The water which has become deposited in or returned to the water receptacle 16 will again be conveyed by the water elevator and discharged into the trough 21, so that the same water may be used over and again in treating grain. This is especially valuable where it is desired to employ some chemical in the water during the treatment of the grain.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is,—

1. In a machine of the character described, the combination of a grain hopper, a grooved feed roller under the bottom thereof, means for controlling the passage of grain to said feed roller, a fluid receptacle, means for controlling the flow of fluid from said receptacle, a trough to receive the grain and fluid, means for elevating grain from said trough, and a bottom trough to receive overflow from the trough which receives the grain and fluid.

2. In a machine of the character described, the combination with a water receptacle, a trough above the water receptacle and adapted to overflow thereinto, and grain and water receptacles disposed over and adapted to discharge separately and simultaneously into said trough, of means for removing grain and water from said trough, and a water elevator communicating with said lower water receptacle and discharging into the upper water receptacle.

3. In a machine of the character described, the combination with a grain hopper, a fluid receptacle located in proximity to said grain hopper, a trough located under said grain hopper and fluid receptacle, and means for discharging grain and fluid simultaneously from said hopper and fluid receptacle into said trough, of a chute communicating with the trough and provided with a perforated false bottom, a water receptacle, a conveyer to remove grain and fluid from the trough, a fluid elevator for conveying fluid from the water trough or receptacle and discharging it into the upper fluid receptacle, and a screen box located over said water trough or receptacle in position to receive overflow from the trough above it.

4. In a machine of the character described, the combination with a water trough, and means for discharging grain thereinto, of a roller in the water trough to force grain under the surface of the water, and means for securing said roller at different vertical adjustments.

5. In a machine of the character described, the combination with a water trough and means for discharging grain downwardly thereinto, of a roller in the trough to force grain under the surface of the water, a scraper for the roller, means for securing the roller and scraper at different vertical adjustments, and means for rotating the roller.

6. In a machine of the character described, the combination with a trough, of receptacles for grain and fluid disposed over said trough and adapted to discharge thereinto, said fluid receptacle being adjustable toward and away from the grain receptacles and means for controlling the flow of grain and fluid from said receptacles to the trough below the same, means for separating the grain and fluid, and means for returning the fluid to said first-mentioned fluid receptacle.

7. In a grain treating apparatus, a plurality of receptacles arranged at different levels, a discharge device from the upper into the lower receptacle, a chamber connected to receive the contents of the lower receptacle and located below the lower line of the same, and a pump arranged to conduct liquid from the chamber to the upper receptacle.

In testimony whereof, I have signed this specification in the presence of two subscribing witnesses.

ROBERT HART.

Witnesses:
 ANGUS HART,
 C. W. DENNISTON.